Patented Feb. 24, 1953

2,629,726

UNITED STATES PATENT OFFICE 2,629,726

METHOD OF PREPARING HALOSILOXANES

James Franklin Hyde, Corning, N. Y., assignor to Dow Corning Corporation, Midland, Mich., a corporation of Michigan No Drawing. Application July 19, 1950, Serial No. 174,807

7 Claims. (Cl. 260—448.2)

This invention relates to a method of preparing halosiloxanes.

It is an object of this invention to provide a novel method for the preparation of organochlorosiloxanes which obviates the necessity of hydrolyzing chlorosilanes and thereby avoids the presence of acids.

In accordance with this invention a silane of the formula $R_nSiX_{4-n}$ where R is alkyl, aryl hydrocarbon, halogenated aryl hydrocarbon, or hydrogen, $n$ has a value from 1 to 2, and $x$ is a halogen, is reacted with a metallic oxide of the group lead oxide, magnesium oxide, calcium oxide, copper oxide, and zinc oxide. The silane and oxide are reacted in amount such that there is present less than one equivalent of metal oxide per equivalent of silicon bonded halogen in the silane. The reaction is carried out in the presence of a solvent of the group liquid saturated aliphatic nitriles, liquid aromatic nitriles, liquid saturated aliphatic nitro compounds, and liquid aromatic nitro compounds. The solvent is present in amount of at least 1 per cent by weight based on the silane.

The applicant has found that reaction between the above defined halosilanes and oxides takes place readily in the presence of nitriles and nitro compounds to produce halosiloxanes of the formula

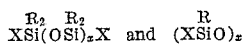

and metal halides. The reaction proceeds smoothly at temperatures from 30° C. up. Normally, the reaction is carried out at the reflux temperature of the mixture.

Whereas reaction between the halosilanes and the metal oxides takes place regardless of the relative proportion of each, in order to obtain halosiloxanes in accordance herewith it is essential that the amount of metal oxide present be less than that equivalent to the amount of halogen in the silane. Thus, for example, 1 mol of $R_2SiX_2$ would be reacted with less than 1 mol of CaO, whereas 1 mol of $RSiX_3$ would be reacted with less than 1½ mols of CaO.

The amount of chlorine remaining in the reaction product will be directly proportional to the amount of oxide employed. Accordingly, highest molecular weight chlorosilanes are obtained by employing the amount of oxide just less than equivalent to the silicon bonded halogen. By varying the relative amount of oxide and silane, chlorosiloxanes ranging all the way from volatile dimers of the type $R_2ClSiOR_2Cl$ to high molecular weight nondistillable products are obtained.

The silanes which are employed in this invention include any silane having 1 or 2 of any of the following groups attached to the silicon. The The groups are hydrogen, alkyl radicals, aryl hydrocarbon radicals, and halogenated aryl hydrocarbon radicals. Specific examples of such silanes which are within the purview of this invention are trichlorosilane, dichlorosilane, methyldichlorosilane, dimethylfluorosilane, phenylmethyldichlorosilane, diphenyldichlorosilane, propyltrichlorosilane, octadecyldichlorosilane, trifluorotolyltrichlorosilane, bistrifluorotolyldichlorosilane, chlorophenylmethyldichlorosilane, xenyltrichlorosilane, and bromoxenyltrichlorosilane. In the silane, X is fluorine, chlorine, bromine, or iodine.

Any saturated aliphatic nitrile, aromatic nitrile, saturated aliphatic nitro compound, and aromatic nitro compound which is a liquid will promote reaction between halosilanes and the herein defined metal oxides, and are included within the scope of this invention. In order that the reaction may proceed at a reasonable rate it is preferred that at least 1 per cent by weight of the solvent based upon the weight of the halosilane be present. It is believed that the solvents promote the reaction because of their polarity. Any amount of solvent above 1 per cent by weight may be employed without deleteriously effecting the reaction. However, in general there is no advantage in employing more than a twofold weight excess of the solvent.

Specific examples of operable solvents are acetonitrile, propionitrile, butyronitrile, valeronitrile, benzonitrile, cyclohexlonitrile, capronitrile, nitromethane, nitroethane, nitropropane, nitrooctane, nitrobenzene, nitrotoluene, and nitrocyclohexane.

It is often desirable to employ a small amount of $CuCl_2$ or $HgCl_2$ as a catalyst for the reaction. The amount of catalyst normally employed is about .1 g. to 2 g. per mol of halosilane. In the presence of such catalysts the reaction is speeded up.

This invention offers an expeditious way of preparing chlorosiloxanes which contain acid-sensative groups. Since no water is employed, hydrogen bonded silanes may be obtained in good yields without any danger of hydrolyzing the hydrogen.

The following examples are given by way of illustration only, and are not to be construed as limiting the invention.

Example 1

A mixture of 1 mol of SiHCl₃ and .25 mols of CuO was refluxed in the presence of 44 g. of acetonitrile and .14 g. of CuCl₂ for one day. Upon removal of the solvent a nondistillable residue having the unit formula $$(ClSiO)\overset{H}{|}$$

was obtained. The chlorosiloxane had a chlorine content of 44.8 per cent.

Example 2

.57 mol of phenylmethyldichlorosilane was reacted with .29 mol of PbO in the presence of 48.3 g. of acetonitrile at reflux temperature for 5 days. Upon distillation of the product there was obtained a mixture of compounds of the formula $$ClSi(OSi)_xCl \begin{matrix} C_6H_5 & C_6H_5 \\ | & \diagdown \\ CH_3 & CH_3 \end{matrix}$$

The product was in two portions, one boiling up to 185° C. at 1 mm., and the other a nonvolatile residue.

Example 3

A mixture of .49 mol of dimethyldichlorosilane, .272 mol of CaO, 43 g. of acetonitrile, and .1 g. of HgCl₂ was refluxed for one day. Upon distillation, compounds of the unit formula (CH₃)₂ClSi[OSi(CH₃)₂]ₓCl, boiling 81° C. to 83° C. at 35 mm. were obtained.

Example 4

A mixture of .61 mol of dimethyldichlorosilane, .3 mol of magnesium oxide, 73.4 g. of acetonitrile, and .1 g. of HgCl₂ was refluxed for one day. Upon distillation a mixture of chlorosilanes of the unit formula of those of Example 3, boiling 91° C. to 155° C. at 33 mm. was obtained.

Example 5

A mixture of .55 mol of dimethyldichlorosilane, .27 mol of zinc oxide, 62.6 g. of acetonitrile, and .1 g. of HgCl₂ was refluxed for one day. Upon distillation a mixture of chlorosilanes having the unit formula of those of Example 3 was obtained. These products had a boiling range of 84° C. to 120° C. at 35 mm.

Example 6

A mixture of .42 mol of methyldichlorosilane, CH₃HSiCl₂, .21 mol of CuO, 35.2 g. of acetonitrile, and .1 g. of CuCl₂ was refluxed one day. A mixture of chlorosiloxanes of the formula $$ClHCH_3Si(OSiCH_3H)_xCl$$

was obtained.

Example 7

Chlorosiloxanes of the formula $$(CH_3)_2ClSi[OSi(CH_3)_2]Cl$$

are obtained when .57 mol of dimethyldichlorosilane is refluxed with .3 mol of PbO for one day in the presence of 50 g. of any of the following solvents: propionitrile, valeronitrile, benzonitrile, nitromethane, nitropropane, and nitrobenzene.

That which is claimed is:

1. A method of preparing halosiloxanes which comprises reacting a silane of the formula $$R_nSiX_{4-n}$$

where R is selected from the group consisting of hydrogen, alkyl radicals, aryl hydrocarbon radicals, and halogenated aryl hydrocarbon radicals, X is halogen, and $n$ has a value from 1 to 2, with a metallic oxide selected from the group consisting of lead oxide, calcium oxide, copper oxide, magnesium oxide, and zinc oxide in amount such that there is less than one equivalent of metal oxide per equivalent of silicon bonded halogen in the silane, in the presence of a solvent selected from the group consisting of liquid saturated aliphatic nitriles, liquid saturated aliphatic nitro compounds, and liquid aromatic nitro compounds, said solvents being present in amount of at least 1 per cent by weight based on the silane and in said solvents the nitrile and nitro groups being the only functional groups present.

2. The method in accordance with claim 1 in which the solvent is acetonitrile.

3. The method in accordance with claim 1 in which the solvent is acetonitrile and the silane is dimethyldichlorosilane.

4. The method in accordance with claim 1 in which the solvent is acetonitrile and the silane is phenylmethyldichlorosilane.

5. The method in accordance with claim 1 in which the solvent is acetonitrile and the silane is trichlorosilane.

6. The method in accordance with claim 1 in which the solvent is acetonitrile and the silane is methyldichlorosilane.

7. A method of preparing halosiloxanes which comprises reacting a silane of the formula $$R_nSiX_{4-n}$$

where R is selected from the group consisting of hydrogen, alkyl radicals, aryl hydrocarbon radicals, and halogenated aryl hydrocarbon radicals, X is halogen, and $n$ has a value from 1 to 2, with a metallic oxide selected from the group consisting of lead oxide, calcium oxide, copper oxide, magnesium oxide, and zinc oxide in amount such that there is less than one equivalent of metal oxide per equivalent of silicon bonded halogen in the silane, in the presence of a solvent selected from the group consisting of liquid saturated aliphatic nitriles, liquid aromatic nitriles, liquid saturated aliphatic nitro compounds, and liquid aromatic nitro compounds, said solvents being present in amount of at least 1 per cent by weight based on the silane, and in contact with a catalyst selected from the group consisting of HgCl₂ and CuCl₂ in amount of about .1 g. of catalyst per mol of silane and in said solvents the nitrile and nitro groups being the only functional groups present.

JAMES FRANKLIN HYDE.

REFERENCES CITED

The following references are of record in the file of this patent:

UNITED STATES PATENTS

| Number | Name | Date |
|---|---|---|
| 2,381,366 | Patnode | Aug. 7, 1945 |
| 2,580,852 | Shaw | Jan. 1, 1952 |

FOREIGN PATENTS

| Number | Country | Date |
|---|---|---|
| 606,301 | Great Britain | Aug. 11, 1948 |